June 10, 1941.  H. W. BRUKER  2,244,673
CUTTING MACHINE
Filed Jan. 20, 1938  2 Sheets-Sheet 1

INVENTOR
Hobart W. Bruker
BY
Ward Crosby & Neal
ATTORNEYS

June 10, 1941.        H. W. BRUKER        2,244,673
CUTTING MACHINE
Filed Jan. 20, 1938        2 Sheets-Sheet 2
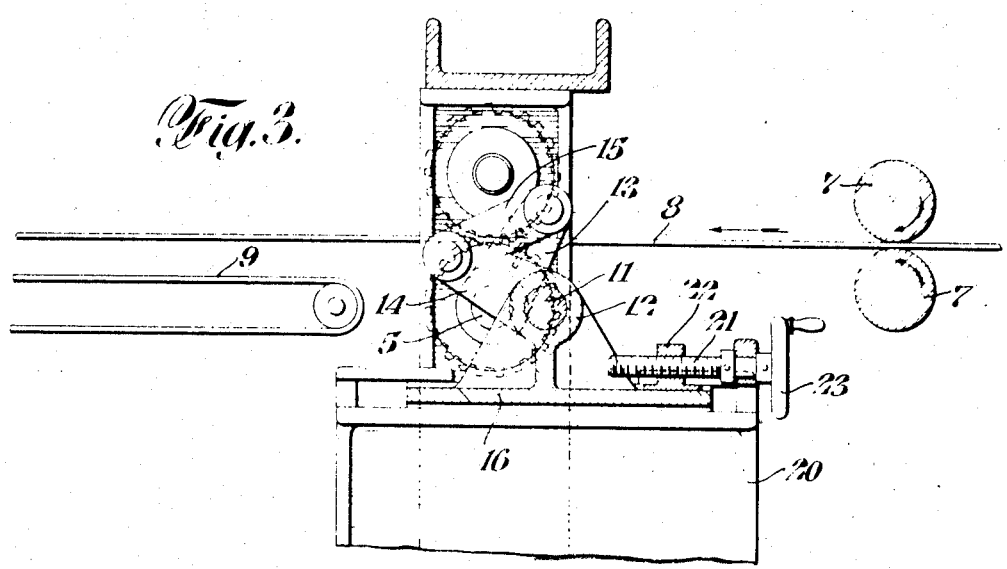
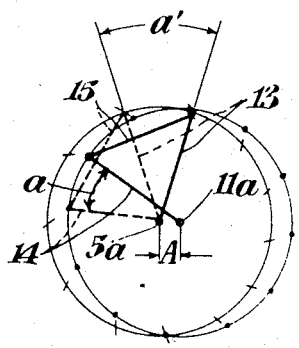 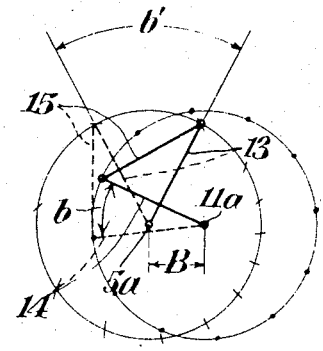 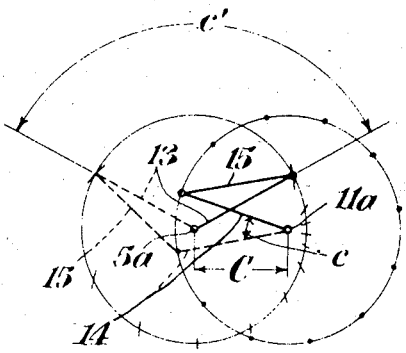
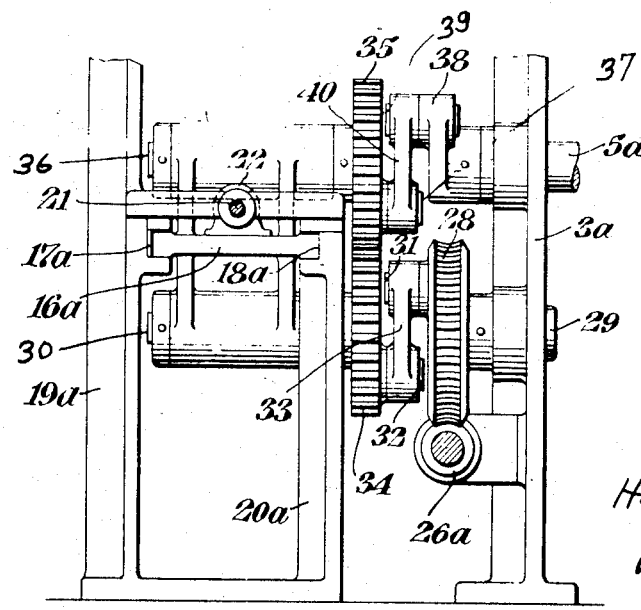
INVENTOR
Hobart W. Bruker
BY
Ward Crosby & Ind
ATTORNEYS Patented June 10, 1941

2,244,673

UNITED STATES PATENT OFFICE 2,244,673

CUTTING MACHINE

Hobart W. Bruker, Bordentown, N. J., assignor to George W. Swift, Jr. Inc., Bordentown, N. J., a corporation of New Jersey Application January 20, 1938, Serial No. 185,837

2 Claims. (Cl. 164—66)

The invention relates to a machine for cutting up advancing material into blanks or units of selected lengths. In the manufacture of corrugated paper board and fibre board, for example, such a cut-off machine is used at the delivery end of the machine which makes the paper board, and as the paper board is delivered from the making machine, the cut-off machine receives the traveling web and cuts it up into blanks of a length depending upon the use to which the material is to be put.

There are a number of requirements which a machine of the above character should satisfy. It is frequently required that the cut-off machine be adjustable to cut throughout a wide range of lengths. To avoid injury to the material or the machine, the cutter when engaging the material should always travel substantially in the same direction and at substantially the same speed as the material being cut throughout its entire range of adjustment for length of cut. Adjusting the machine to different lengths of cut either by altering the speed of feed of the material to be cut or the frequency of operation of the cutter will cause the above mentioned speed of travel of the cutter (hereinafter called "cutting speed") to be thrown out of equality with the speed of feed of the material, unless the machine be provided with special motion compensating features. In cutting machines of the above character various mechanisms such as differential gearings and elliptical gears and crank mechanisms having adjustable crank pin and slot elements, have been used for the purpose of regulating the cutting speed to keep it equal to the speed of travel of the material being cut, and to enable the cutting speed to be regulated while the machine is running.

The present invention aims primarily to provide mechanism for regulating the cutting speed of the cutter, which may be readily adjusted while the machine is running (as well as when at rest), and which will be relatively simple and inexpensive in construction, and yet afford the needed regulation in cutting speed over a wide range in length of cut. Further objects and advantages of the invention will be in part obvious and in part specifically referred to in the description hereinafter contained which when taken in conjunction with the accompanying drawings, discloses a machine constructed to operate in accordance with the invention; such disclosure, however, should be regarded as merely illustrative of the principles of the invention. In the drawings—

Fig. 3 is a detail section on line 3—3 of Fig. 2 looking in the direction of the arrows.

Figs. 4 to 6 are diagrammatic views illustrating different adjustments of the cutting speed regulating mechanism.

Fig. 7 is a view similar to Fig. 2 but showing a somewhat modified construction.

Figure 2:
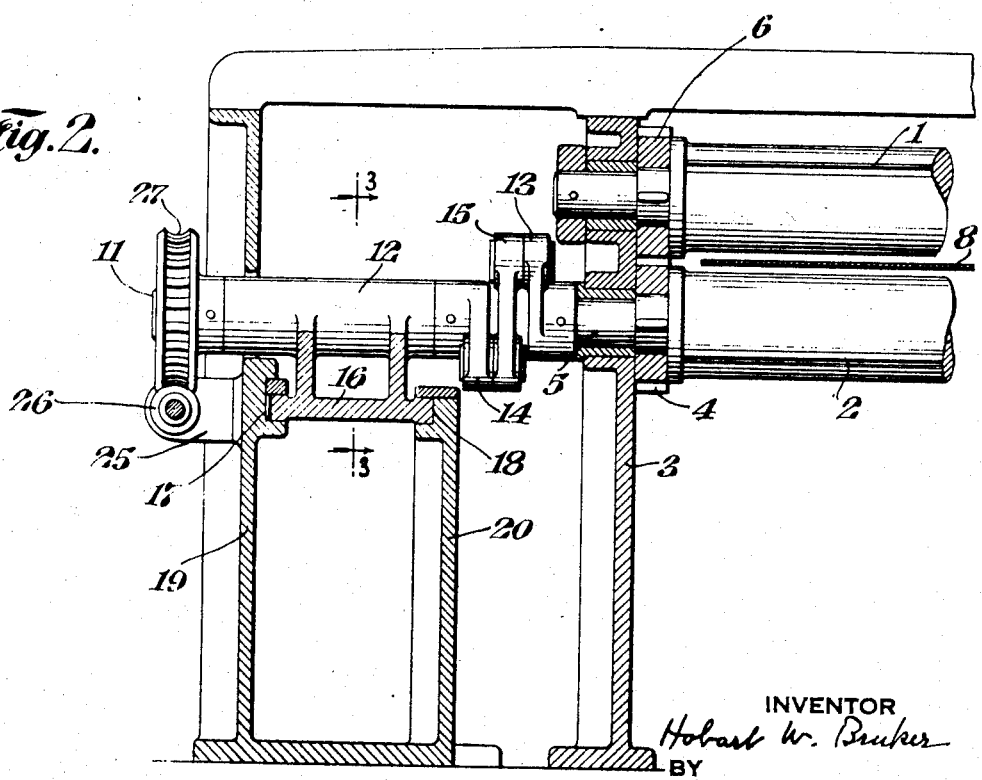
Fig. 2 is a section on line 2—2 of Fig. 1 looking in the direction of the arrows.

The invention is illustrated as applied to a cutting machine having cooperating cutters 1 and 2 (Fig. 2) suitably supported by side frames 3. As shown the cutters are of simple rotary type, the gear 4 on the shaft 5 of the lower cutter 2 driving a gear 6 associated with the upper cutter, but various different cutter constructions capable of use are known in the art, and accordingly this part of the machine will not be described in great detail. Where wide widths of material are to be operated on, the line of cut usually travels transversely across the web as the cutter moves along therewith.

Figure 1:
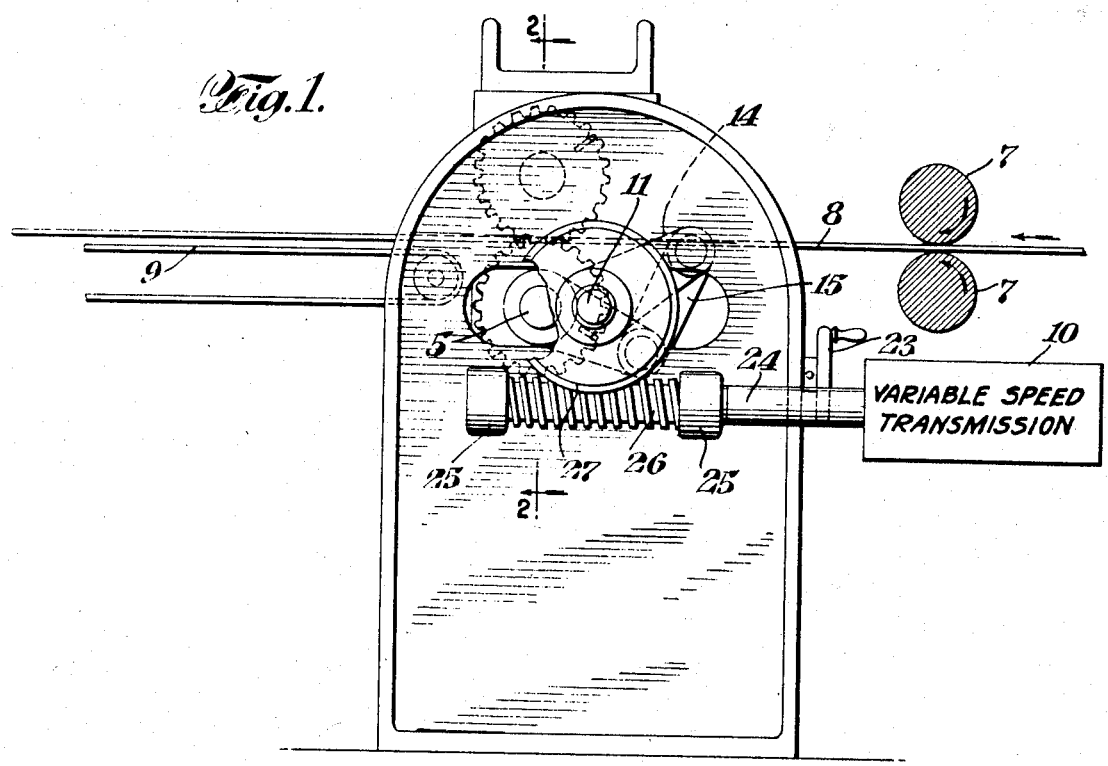
Fig. 1 is a side elevation of a cutting machine constructed to operate in accordance with the invention, certain conventional parts being omitted with which the present invention is not particularly concerned.

In Figs. 1 and 3 I have shown diagrammatically a pair of feed rolls 7 which may be used to feed a web 8 to be cut, in between the cutters 1 and 2, and the cut blanks may be delivered from the machine by suitable conveying mechanism such as the belts 9 shown diagrammatically in Figs. 1 and 3.

In the illustrated embodiment of the invention the web 8 may be assumed to be fed at constant speed to the cutters, irrespective of the particular length of blank to be cut, and driving power may be supplied to the cutters through a suitable variable speed transmission, illustrated diagrammatically at 10, in such manner that by adjusting the output speed of the variable transmission, the cutters will be caused to operate at a rate so coordinated with the speed of travel of web 8, as to cause blanks of the desired length to be cut. Variable speed transmissions suitable for the above purposes are well known in the art and accordingly the same will not be described in detail herein.

In accordance with the present invention, to enable the cutting speed of the cutters to be regulated while the mechanism is running, to keep this cutting speed or its component of motion in the direction of travel of the material being cut, equal to the speed of travel of the material, when the machine is adjusted to cut blanks of different lengths, I employ in the driving gearing of the cutters, rotary driving and driven members between which a link is interposed so as to be pivotally connected to each of said members at a point spaced from their respective axes of rotation. One of these members is carried by a normally stationary support or bearing which is adjustable in position, and accessible for adjustment while the machine is running so as to vary the angular relation or eccentricity of one of said members with respect to the other. In other words, although the driving member travels at uniform angular velocity in any given setting of the variable speed transmission 10, the above adjustment may be set to produce different degrees of variation in the angular velocity of the driven member, which variations in velocity are thereby imparted to the cutters, and by selecting the proper setting of the adjustment, the cutting speed of the cutters may be kept equal to the speed of travel of the material being cut.

In the illustrated form of the invention the shaft 5 of lower cutter 2 is utilized as the rotary driven member above referred to, and the rotary driving member is constituted by a stub shaft 11 mounted in a suitable bearing 12. The shaft 5 has crank arm 13 affixed thereto and the shaft 11 likewise carries a crank arm 14. A link 15 extends between and is pivotally connected to the ends of the cranks 13 and 14.

The stub shaft 11 and its bearing 12, in the illustrated form of the invention, are carried by a suitable frame 16 (Fig. 2) which is shown as slidable in ways 17 and 18 provided respectively in auxiliary side frame 19, and a web 20 extending up from the base of the machine. As shown the rotary driving member or shaft 11 is located in general endwise relation to the rotary driven shaft 5, and if the axes of rotation of the two shafts are alined, the angular velocity of the driven shaft will be in all phases equal to that of the driving shaft. But if the position of the frame 16 be so adjusted that the axes of rotation of the two shafts 11 and 5 are somewhat out of line, the angular velocity of the driven shaft will vary with respect to that of the driving shaft during each revolution, the driven shaft turning at times faster and at other times more slowly than the driving shaft. The extent of the above variations in angular velocity will depend upon the distance between the axes of rotation of the shafts.

The link 15 forms a connection between the driving and driven shafts 11 and 5, which can be adjusted while running, and the frame 16 is readily accessible for adjustment while the moving parts of the machine are in operation. Suitable means is provided to adjust the frame 16 such as the screw 21 (Fig. 3) engaging nut 22 on member 16, and operated by a hand wheel or the like 23. It will be understood that suitable devices may be employed to indicate the setting of the variable speed transmission 10 and the rotary driving shaft 11, so that the cutting speed of the cutters may be quickly regulated to correspond to the length of cut for which the variable speed transmission is set, but since suitable devices for the above purpose are well known in the art they will not be described in detail herein. It is also possible to adjust the position of the driving shaft 11 while the machine is at rest.

Power is supplied to the driving shaft 11 through gearing which maintains driving relationship during adjustment of shaft 11 and in its various adjusted positions. In the form shown in Figs. 1 and 2, a spindle 24, journaled in brackets 25 extending from the side frame 19, extends from the output end of the variable speed transmission 10, and is provided with a worm 26 which engages with a worm wheel 27 on the outer end of shaft 11. Thus as the shaft 11 is adjusted in position, worm wheel 27 travels along worm 26.

In Figs. 4 to 6 I have indicated diagrammatically the effect of adjustment of shaft 11 upon the angular velocity of the driven shaft 5, and consequently upon the cutting speed of the cutters. In Fig. 4 the axis of rotation of shaft 11 is indicated at 11a as being spaced a distance A from the axis of rotation 5a of shaft 5. The crank 14 is indicated in Fig. 4 as having moved through an angle $a$ from the full line position to the dotted line position, while the driven crank 13 has moved through an angle $a^1$ which is somewhat larger than angle $a$, thus indicating that in the particular adjustment of the shafts shown in Fig. 4, and in the phase of rotation there illustrated, the driven crank 13 is moving at somewhat higher angular velocity than the driving crank 14.

Fig. 5 shows the parts in a somewhat different setting wherein the axes of rotation 5a and 11a of the shafts are spaced a somewhat greater distance B, and the driving crank 14 has moved through an angle $b$, while the driven crank 13 has moved through a much greater angle $b^1$. In Fig. 6 the axes of rotation 5a and 11a are spaced a still greater distance C and the driving crank 14 has moved through an angle $c$, while the driven crank 13 has moved through a much greater angle $c^1$. If the axis of rotation 5a and 11a coincide, the angular velocity of the driving and driven shafts 11 and 5 of course will be the same in all phases, and if the axis 11a be adjusted to a position at the left of axis 5a, instead of at the right as shown in Figs. 4 to 6, an additional range of variation in angular velocity will be obtained.

In the use of a cutting speed regulating mechanism of the character above described, the cutting speed may be properly controlled over a range in length of cut in the ratio of 5 or 6 to 1, adjusting the shaft 11 only to one side of shaft 5. For example, if the two shafts are coaxial for a thirty inch length of cut, adjustment of shaft 11 to one side of coaxial position may be made which will afford a length of cut of 150 or 160 inches without getting beyond the practical range of variation in motion. And by adjustment of shaft 11 to the opposite side of shaft 5, cutting speeds appropriate for lengths of cut less than thirty inches may be obtained.

A cutting speed regulating mechanism of the nature above described has marked advantages from the standpoint of simplicity, economy, compactness and range of adjustment, as compared to mechanisms involving the use of elliptical gears, eccentric crank pin and slot elements, and the like, such as have been heretofore used for similar purposes, and enables adjustment to be rapidly made while the machine is running. The mechanism is also well adapted to use in the so-called "duplex" cut-off machines of the type illustrated in Reissue Patent to George W. Swift, Jr., No. 19,989, May 26, 1936.

In Fig. 7 I have shown a cutting speed regulating mechanism of somewhat modified form and which is adapted for installations in which a still greater range of adjustment of the cutting speed is desired, or wherein it is desired that comparatively small adjustments shall produce larger variations in the motion of the cutter.

The form of the invention illustrated in Fig. 7 includes two cutting speed regulating mechanisms operating in series so that the individual effects thereof are multiplied. Power for driving the cutters may be assumed to be supplied through a worm 26a similar to the worm 26 previously described, and which turns a worm wheel 28 carried by a shaft 29 which is journaled in side frame 3a (similar to frame 3 previously described). An intermediate shaft 30 is journaled in a frame 16a, in general similar to the frame 16 previously described, and slidable in ways 17a and 18a associated respectively with an auxiliary side frame 19a and supporting web 20a in general similar to the respective parts 17, 18 and 19.

In the embodiment of the invention shown in Fig. 7, the worm wheel 28 is provided with a crank pin 31 and thus serves as the first crank element of the driving train while the intermediate shaft 30 carries a gear member 34 which is likewise provided with a crank pin 32 likewise spaced from its axis of rotation, and thus serves as the second crank of the driving train. A link member 33 (similar in mode of operation to the link 15 previously described) pivotally engages the crank pins 31 and 32; thus the angular velocity of the gear member 34 as compared to that of worm wheel 28, in any given phase of rotation, will depend upon the setting of frame 16a, as above described in connection with Figs. 1 to 6.

The gear 34 in turn drives a gear 35 carried by an intermediate shaft 36 which latter is also journaled in the adjustable frame 16a. Gear 35 carries a crank pin 37 spaced from its axis of rotation, and a cutter shaft 5a (similar to shaft 5 previously described) is also provided with a crank 38 carrying a crank pin 39. Gear 35 thus serves as the first of a second pair of cranks in series with crank members 28 and 34, and a link member 40 (similar to member 33 above described) is pivotally connected to the crank pins 37 and 39.

Thus to an extent depending upon the setting of frame 16a, the intermediate shafts 30 and 36 may be adjusted to different positions of eccentricity with regard to their respectively cooperating shafts 29 and 5a, and the variations in angular velocity which are produced in the gear member 34 will be imparted to the gear member 35. Further variations in angular velocity will be produced as between gear 35 and crank 38, thus multiplying the effects of the two sets of cranks and connecting links. Smaller adjustments in the setting frame 16a accordingly will produce relatively larger changes in the speed of cut, and the total range in length of cut over which the mechanism is capable of properly regulating the speed of cut, will be correspondingly increased.

In both of the above described embodiments of the invention, the cutters preferably are so angularly related to their driving gearing that they cut at a phase in which the variation in angular velocity produced by the driving gear is at a maximum. If the cutters are set to cut in different phases of rotation of the driving gearing, different degrees of regulation of the speed of cut will be obtained, and when the invention is applied to rotary cutters of the type above described, it will usually be found possible to make both cutters of the same radius, and keep this radius comparatively small as compared to certain prior constructions for similar purposes which have required that one of the cutters be twice the diameter of the other in order to secure the requisite range of adjustment in cutting speed.

Although certain particular embodiments of the invention have been described, it should be understood that from the standpoint of the invention in its broader aspects, many changes may be made therein without departing from the invention, within the scope of the appended claims.

I claim:

1. A cutting machine of the continuously driven type including a cutter constructed to have at the time of cutting a component of motion in the direction of travel of the material being cut, and an actuating mechanism for said cutter including rotary driving and driven members, a link pivotally connected to each of said driving and driven members at points spaced from their respective axes of rotation, a normally stationary support rotatably carrying one of said rotary members, said support however being slidably mounted for movement in a path transverse to the axes of rotation of said rotary members to vary the distance between such axes of rotation and thereby regulate the cutting speed of the cutter, mechanism for positioning said support in various positions in said path, the above mentioned parts of the machine being constructed and arranged to afford adjustment of said support while the machine is running, and a rotary power transmitting member rotatable about a fixed axis which is connected to the aforesaid movable rotary member by gearing constructed and arranged to maintain power transmitting connection between said last mentioned members upon sliding movement of said support from one position to another.

2. A cutting machine of the continuously driven type including a cutter constructed to have at the time of cutting a component of motion in the direction of travel of the material being cut, and an actuating mechanism for said cutter including rotary driving and driven members, and crank members interposed therebetween which are constructed to regulate the cutting speed of the cutter according to the distance between the axes of rotation of said rotary members, a normally stationary support rotatably carrying one of said rotary members and also carrying a worm gear in driving relation to said last mentioned rotary member, said support however being slidably mounted to move in a path which alters the distance between the axes of rotation of said rotary members, and a worm member engaging said worm gear, said worm member having its axis of rotation positioned substantially parallel to the path of movement of said support to maintain driving relationship with said worm gear in different positions of said support.

HOBART W. BRUKER.